United States Patent [19]

Siegel

[11] Patent Number: 5,233,836
[45] Date of Patent: Aug. 10, 1993

[54] SORPTION TEMPERATURE CHANGING INSERTS

[76] Inventor: Israel Siegel, 2980 Point East Dr., Apartment D-612, N. Miami Beach, Fla. 33160

[21] Appl. No.: 926,947

[22] Filed: Aug. 10, 1992

[51] Int. Cl.⁵ .............................................. F25D 5/00
[52] U.S. Cl. ........................................ 62/4; 126/263; 165/104.12
[58] Field of Search .......................... 62/4; 126/263; 165/104.12

[56]  References Cited
U.S. PATENT DOCUMENTS

| | | | |
|---|---|---|---|
| 3,305,319 | 2/1967 | Kowalick et al. | 62/4 |
| 3,515,518 | 6/1970 | Halstead et al. | 62/4 |
| 4,528,218 | 7/1985 | Malone | 62/4 |
| 4,752,310 | 6/1988 | Maier-Laxhuber et al. | 62/4 |
| 4,753,085 | 6/1988 | Labrousse | 62/4 |
| 4,773,389 | 9/1988 | Hamasaki | 62/4 |
| 4,850,424 | 7/1989 | Mitani et al. | 126/263 |
| 4,911,740 | 3/1990 | Schieder | 62/4 |

*Primary Examiner*—Ronald C. Capossela

[57]  ABSTRACT

A self cooling insert consists of an air evacuated heat-exchange chamber containing water. The water boils at low temperatures and cools the chamber. The cold heat-exchange chamber is then dipped in a beverage to absorb heat from the beverage. The vapor generated by the low boiling point liquid is removed through sorption by a desiccant placed in a separate chamber, on top of the heat exchange chamber. A pipe communicates between the vapor phase of the heat-exchange chamber and the desiccant chamber. A vapor distributor tube in the desiccant chamber conducts the vapor to the top surfaces of the desiccant. The temperature changing potential of the device can be preserved indefinitely by a barrier which blocks the communication between the chambers. The barrier is mechanically linked to a magnet inside the insert. The inside magnet is manipulated by an outside magnet placed in proximity to surface of the insert. The barrier is kept in its blocking position by a force of attraction between the magnets. The temperature changer is activated by turning the outside magnet upside-down, a fact which changes the attractive force between the magnets to a repulsive force.

11 Claims, 1 Drawing Sheet

SORPTION TEMPERATURE CHANGING INSERTS

BACKGROUND AND OBJECTIVES

The invention relates to cooling devices and in particular to self-cooling and self-heating devices. Previous inventions relating to sorption self-cooling and self-heating containers have been described by the present author in U.S. Pat. Nos. 4,250,720, 4,736,599, 4,928,495, 5,079,932, in an allowed but not yet issued U.S. patent application Ser. No. 07/763,645, and a U.S. patent application Ser. No. 07/918,605. Essentially, the self-cooling and self-heating containers consists of a heat-exchange chamber containing water, the boiling point of which has been lowered by an air vacuum in the chamber. The chamber communicates through a pipe with another chamber containing a desiccant. As the water boils in the heat-exchange chamber it cools itself and absorbs heat from a food or a beverage which is preferred to be consumed at low temperatures. The vapor generated by the low boiling point water is removed by the desiccant. The vapor sorbed by the desiccant heats the desiccant. The desiccant then delivers heat to a food or a beverage which is preferred to be consumed at high temperatures. by closing the communication between the water and desiccant chambers the self cooling and self heating device can be stored indefinitely without losing its temperature changing potential. The cooling or heating action is initiated by opening of the communication between the water and the desiccant chambers. In all of the above inventions the cooling mechanism has been an integral part of the container which contains the food or the beverage which is to be cooled or heated. The main objective of the present invention is to adapt the cooling devices to inserts which are not structuraly part of the food containers. The inserts can then be dipped in and out of food or beverage containers to change the temperature of the food or the beverage.

SUMMARY

The self-cooling and self-heating insert consists of a heat exchange chamber and desiccant chamber pair in which the desiccant chamber is adapted to be placed on top of the heat exchange chamber. This allows an obstruction free insertion of the heat exchange chamber in a variety of different containers with a beverage or a food. The communication between the chambers is controlled by a movable barrier, such as a stopper, which opens and closes the communication between the chambers. The stopper is connected to an inside magnet in order to transmit the magnet's movement to the stopper. The stopper is kept in a position which blocks the communication between the chambers, by a force of attraction of between its associated inside magnet and an outside surface magnet. When the magnets are attracted to each other the communication between the chambers is closed and the insert can be stored indefinitely, in an inactive form, without losing its temperature changing potential. The temperature changer is activated by turning the outside magnet upside-down. This changes the attractive force between the magnets to a repulsive force. This removes the barrier from the position which had blocked the communication between the chamber, and allows a communication between the chambers. This activates the device by allowing a sorption by the desiccant of the vapor generated by the low boiling point water in the heat exchange chamber. Because of its top position the desiccant chamber requires a separate tube in the desiccant chamber which distributes the vapor to the top surfaces of the desiccant. The cooling action of the insert can be renewed by the selective heating of the desiccant chamber to expel the sorbed vapor from the desiccant chamber back into the heat exchange chamber.

DETAILED DESCRIPTION

Figure 1:
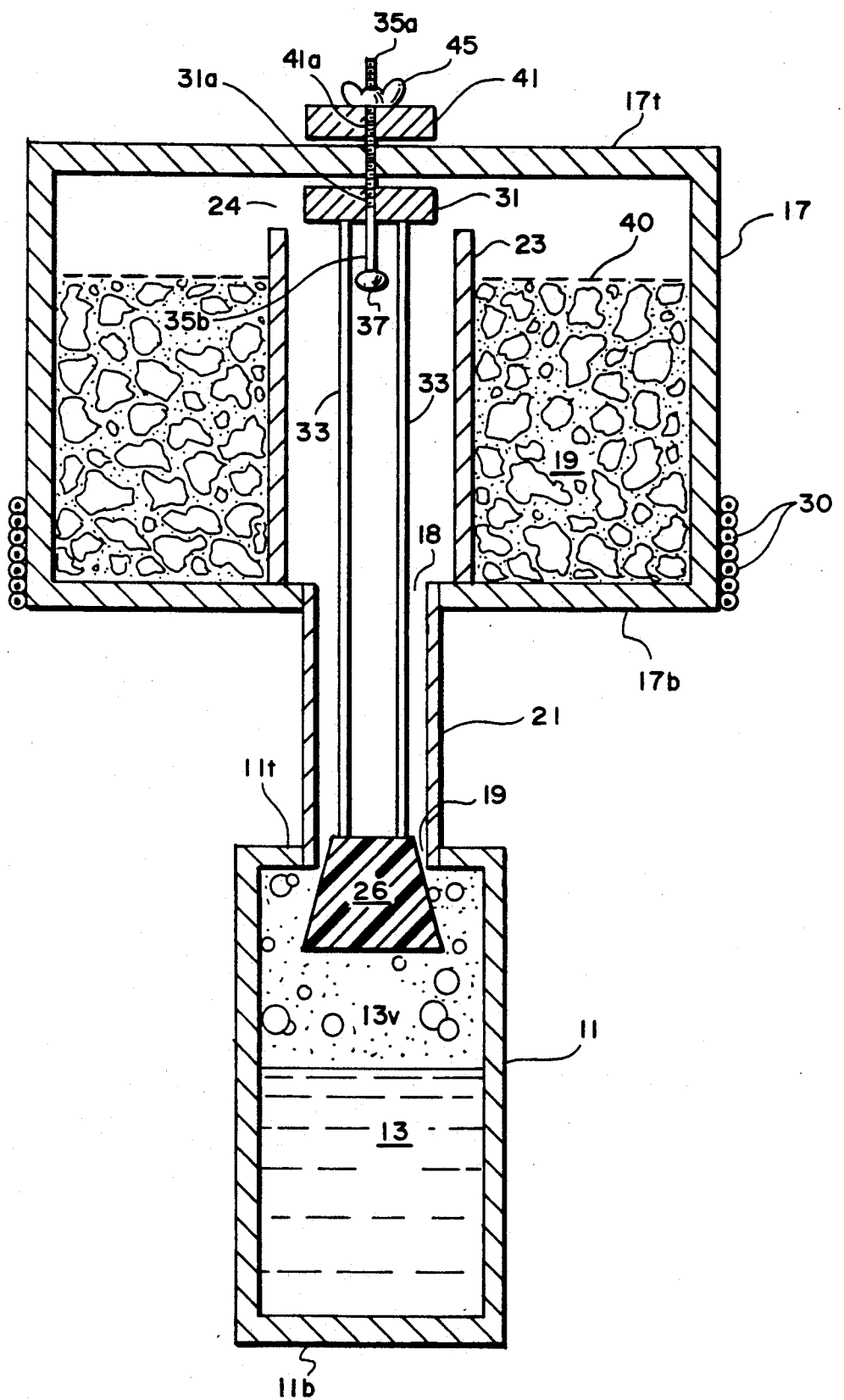
FIG. 1 is a cross-sectional view of a preferred embodiment of a reusable self-cooling insert in which the communication between the liquid and the desiccant chamber is opened and closed by changes in the polarity of an outside magnet.

Referring to FIG. 1, there is shown a chamber 11, with top wall 11-t and bottom wall 11-b. An air vacuum is present in the chamber. The walls of the chamber and all other structural components which are exposed to atmospheric air are constructed of non-porous materials, such as tin, aluminum, or plastic. The material must be strong enough so that it does not deform during the presence of an air vacuum in the chamber. Water 13 is present in the chamber. The air vacuum required may be achieved through a temporary outlet (not shown) connected to an air pump (not shown). The same outlet may then be connected to a water source (while maintaining the air vacuum), to transfer water 13 into the liquid chamber 11. The outlet is sealed after the transfer of the water into the chamber. The water evaporates to form a vapor phase 13v above the liquid level of the water 13.

Present above chamber 11 is another chamber 17. The chamber has top wall 17-t and a bottom wall 17-b. Inside chamber 17 there is a desiccant 19, such as calcium sulfate granules, or molecular sieve granules like Silico Aluminate Zeolite. Present on the top outside surfaces of chamber 17 are electric heating coils 30. Associated with the coils is a thermostat (not shown) to keep the coils at a predetermined temperature. These function as the desiccant regenerating means, as will be described.

Present on the bottom wall of container 17 is opening 18. Present on the top wall of container 11 is opening 19. A conduit 21 communicates between chambers 11 and 17 through openings 18 and 19. The pipe is made of strong material so that it can support and fix the relative positions of chambers 11 and 17. Present inside container 17 is a pipe 23. Pipe 23 functions to distribute vapor in container 17, as will be described. The arrangement is that the diameter of pipe 23 is larger than the diameter of opening 18. Pipe 23 is placed vertically in container 17 on top of opening 18, and the bottom wall of pipe 23 is attached to the inside of bottom wall 17-b of container 17. The top end of pipe 23 is open and reaches the top portion of container 17. A gap 24 exists between the top open end of tube 23 and the top wall 17t of container 17. The arrangement causes any vapor entering opening 19 to enter pipe 23 and to exit from the top of pipe 23 through gaps 24, as will be described.

Entering the bottom of conduit 21 in bottom opening 19 is a stopper 26. The relative dimensions of stopper 26 and opening 19 are such that the stopper enters in and out of opening 19 from container 11. When the stopper is inserted into opening 19 it blocks the opening and prevents a communication between chamber 11 and chamber 17. When the stopper is taken out of opening 19 a communication is established between the chambers.

Present in the top portion of tube 23 is a magnet 31 in the shape of a flat disk. The dimensions of the cross area of the magnet are smaller then the dimensions of the cross area of tube 23. This allows a free vertical movement of magnet 31 in tube 23. Rods 33 are present in inside tubes 23 and 21 between magnet 31 and stopper 26. The top ends of the rods are attached to the inside surface of magnet 31, while the bottom ends of the rods are attached to the inside surface of stopper 26. This provides a mechanical linkage which causes the stopper and magnet to move together during the operation of the device. Present on top of chamber 17 is rod 35a. The rod serves as a guiding rod as will be explained. The rod penetrates the center of wall 17-t and continues in the top portion of of chamber 17. The surface 17t thus divides the guiding rod into a guiding rod portion 35a which is above surface 17t, and a guiding rod portion 35b which is below surface 17. The penetrated area of surface 17t is sealed with a sealing material, such as solder, which will maintain the structural integrity of surface 17t and prevent any leak from the chamber 17. Present in the center of magnet 31 is a hole 31-a. The arrangement is that guiding rod portion 35-b is placed inside hole 31-a of magnet 31. This allows a free vertical movement of the magnet but fixes the horizontal position of the magnet in tube 23. Present on guide pin 35 under magnet 31, at a predetermined distance from top wall 17t, is knob 37. The knob is larger than the interspace between magnet 31 and the side walls of tube 23. Knob 37, therefore forms an obstruction to the downward movement of magnet 31 around guiding rod 35-b. Thus, the arrangement is that the magnet 31 is free to travel upward until it encounters the inside of top surface 17t. The magnet is free to travel downward until in encounters knob 37. The relative distances between magnet 31 and stopper 26, and between top surface 17t and knob 37 are such that as magnet 31 reaches it upper limit of travel, at surface 17t, stopper 26 is positioned in opening 19 and closes tube 21. This stops the communication between containers 11 and 17. When magnet 31 reaches its lower limit of travel at knob 37, stopper 26 is positioned at a lower level than opening 19. This opens tube 21 and allows a communication between containers 11 and 17.

Present on top of surface 17t is another magnet 41. The shape of outside magnet 41 is similar to that of inside magnet 31. Present in middle of magnet 41 is a hole 41a. The arrangement is that guiding rod portion 35a passes through hole 41a to keep magnet 41 in a position which is exactly opposite that of magnet 31. The guiding rod 35a is threaded in order to hold wing nut 45 above magnet 41. This prevents the magnet 41 from falling off the guiding rod. The relative strength of the magnets are such that when magnet 41 is placed on guiding rod with its bottom surface having a polarity opposite to that of the polarity of the top surface of magnet 31, the magnets are attracted to each other. The magnets travel toward each other so that magnet 41 forms a contact with the outside surface of 17t, while magnet 31 forms a contact with in inside surface of surface 17-t. The upward travel of magnet 31 causes a corresponding travel of stopper 26 into opening 19. This closes the communication between chambers 11 and 17. When magnet 41 is turned upside-down the magnets are repelled from each other. When magnet 41 is brought into contact with the outside surface of 17-t, magnet 31 is pushed downward. This causes stopper 26 to leave its position in opening 19. This opens the communication between chambers 11 and 17.

Present on the top surfaces of desiccant 19 is a net 40. The borders of the net are attached to the inside walls of container 17 to fix the net in a plane which is lower than gaps 24 of tube 23. The arrangement is that the openings of net 40 are smaller then the individual granules of desiccant 19. The net thus forms a physical barrier which prevents the desiccant granules from reaching opening 21a. The net thus prevents the accidental transfer of desiccant 19 from desiccant chamber 17 to water chamber 11, but allows a free movement of vapor between the chambers.

The operation of the device is as follows. When a cooling action is not desired magnet 41 is present on guiding rod 35a with its bottom surface having a polarity opposite to that of the polarity of the top surface of magnet 31. Wing nut 45 is present above magnet 41 and prevents an accidental movement of magnet 41 from its position. The force of attraction between the magnets places magnet 31 on the top inside surface 17t of container 17. Stopper 26 is present inside opening 19 and prevents a communication between chambers 11 and 17. The vacuum in chamber 11 causes water 13 to boil until the vapor pressure in chamber 11 becomes equal to the vapor pressure of the boiling water. This stops the additional boiling of the water, and the device can be stored indefinitely at ambient temperatures without losing its cooling potential.

When a temperature change is desired wing nut 45 and magnet 41 are removed from guide rod 35-a. Magnet 41 is then turned upside-down and placed on guiding rod 35a with the bottom surface of magnet 41 having a polarity which is the same as that of the top surface of magnet 31. Magnet 41 is then placed on the outside surface 17t of container 17 and wing nut 45 is placed above the magnet to keep the magnet in its position. Magnet 31 is then repelled from magnet 41. The force of repulsion causes magnet 31 to travel downward towards knob 37. The downward movement of magnet 31 causes a corresponding downward movement of stopper 26 away from opening 19 of conduit 21. This opens the communication between chambers 11 and 17. This allows vapor 13-v to leave chamber 11 and enter chamber 17. The vapor which enters chamber 17 is absorbed or adsorbed by desiccant 19. The vapor sorbed by the desiccant deposits its heat content in the desiccant. This heats the desiccant. The heat is then lost to the outside environment through the walls of the desiccant chamber. If desired, the heat may be transferred to a food or beverage (not shown) placed in contact with desiccant chamber walls. The sorption of the vapor in the desiccant chamber reduces the vapor pressure in chamber 17 to below that of chamber 11. This causes an additional transfer of vapor from chamber 11 to chamber 17. The vapor in chamber 11 is then replaced by additional boiling of water 13 in chamber 11. The water boils continuously until desiccant 19 is saturated with water vapor, or until the temperature of water 13 drops to its low boiling point. When the temperature of water 13 drops it cools chamber 11. The relatively cold surfaces of container 11 is then dipped in a beverage to absorb heat from the immersing beverage.

The temperature changing capabilities of the system can be renewed by a selective heating of the desiccant chamber through coils 30. This can be accomplished as follows. Magnet 41 is placed on surface 17t in a way that would repel magnet 31, as described above. This would keep the communication between chambers 11 and 17 open. Container 11 is then immersed in ambient temperature water to keep chamber 11 relatively cold. The desiccant chamber is then connected to household electric power for about 2 hours. During this period the coils 30 (controlled by a thermostat) heat desiccant 19 to about 250 degrees C. This expels the vapor sorbed by desiccant 19 back into water chamber 11. The vapor re-condenses into water in chamber 11, because of the relatively low temperature in chamber 11. After about 2 hours magnet wing nut 45 and magnet 41 are removed. Magnet 41 is then turned upside-down and returned to guiding rod 35. The force of attraction between magnets 31 and 41 causes stopper 26 to return to opening 19 to close the communication between chambers 17 and 11. The desiccant chamber is then disconnected from the electric current, and chamber 11 removed from the immersing water. The device can then be stored indefinitely at ambient temperatures without losing its temperature changing potential. It can be reactivated by turning magnet 41 upside-down as described above.

It is understood that the above preferred embodiment was given as an example, and that certain changes may be made without departing from the essence of the invention, as defined in the claims. The chambers 11 and 17 may be made in variety of shapes for cosmetic or practical reasons. For example, the part of the top surface of the desiccant chamber may be concave in order to receive a food, such as soup. Thus, the reusable temperature changer may simultaneously serve as a cooling bottom insert and a warming top plate. While the invention described a top desiccant chamber and a bottom water chamber, the positions of the chambers can be reversed, and the desiccant chamber can then function as a self heating insert. A disc made out of a magnet responsive material, such as iron instead of a magnet, may be substituted for one of the magnets. A variety of magnetic arrangements may be used to close and open the communication between the chambers. Mechanical means, such as standard vacuum valves may likewise be used to open and close the communication between the chambers. Refrigerants other than water, such as an alcohol, or a freon, may be used as cooling low boiling point cooling agents.

NUMERICAL EXAMPLE

The evaporation of 1 gram of water absorbs about 540 calories of heat from its environment. Standard desiccants absorb water vapor which is about 10 to 15 percent of the desiccant's weight. The following is a practical numerical illustration derived from experimental data. The quantity of low boiling water 13, required to lower the temperature of a beverage by about 20 degrees C, should be about one tenth the quantity of the beverage which is to be cooled. The amount of a desiccant, such as calcium sulfate, should be approximately equal to the quantity of the beverage used. For example, 50 ml of the low boiling point water in the heat exchange chamber 11, and 500 gram of the desiccant in the desiccant chamber 17, would be required to lower the temperature of 500 ml of a beverage from 30 degrees to 10 degrees C.

What is claimed is:

1. A sorption temperature changing insert consisting of a heat exchange chamber,
    a liquid in said heat exchange chamber,
    an air vacuum in said heat exchange chamber to lower the boiling point of said liquid,
    means to create said vacuum,
    a second chamber,
    a desiccant in said second chamber,
    at least one of said chambers adapted to be inserted in and out of containers to change the temperature of the contents of said containers.
    a communication between said heat exchange and said desiccant chambers,
    and means to open and close said communication between the chambers.

2. The invention as described in claim 1 wherein said desiccant chamber is placed on top of said heat-exchange chamber to allow space for said insertion of said heat exchange chamber.

3. The invention as described in claim 2 wherein the the top desiccant chamber is adapted to form a close contact with an object to increase the temperature of said object.

4. The invention as described in claim 3 wherein said magnet responsive body is a magnet.

5. The invention as described in claim 3 wherein said inside magnet responsive body is placed close to the surface of said temperature changer provide a proximity to the magnetic forces of said outside magnet.

6. The invention as described in claim 3 and including means to change the polarity of said outside magnet.

7. The invention as described in claim 1 wherein said liquid is water.

8. The invention as described in claim 1 and including means to regenerate said desiccant.

9. A sorption self-cooling insert consisting of a heat exchange chamber,
    a liquid in said heat exchange chamber,
    an air vacuum in said heat exchange chamber to lower the boiling point of said liquid,
    means to create said vacuum,
    a second chamber,
    a desiccant in said second chamber,
    a communication between said heat exchange and said desiccant chambers to conduct vapor generated by said low boiling point liquid from said heat exchange to said desiccant chamber,
    means to open and close said communication between the chambers,
    and means to distribute said vapor in said desiccant chamber.

10. A sorption temperature changer consisting of a heat exchange chamber,
    a liquid in said heat exchange chamber,
    an air vacuum in said heat exchange chamber to lower the boiling point of said liquid,
    means to create said vacuum,
    a second chamber,
    a desiccant in said second chamber,
    a communication between said heat exchange and said desiccant chambers,
    a movable barrier opening and closing said communication,
    a magnet responsive body inside said temperature changer,
    connecting means between said movable barrier and said inside magnet responsive body to transmit the movement of said inside magnet responsive body to said movable barrier,
    and an outside magnet to control the movements of said inside magnet responsive body to open and close said communication.

11. The invention as described in claim 10 wherein said barrier consists of a stopper.

* * * * *